March 3, 1942.  J. P. BURKE  2,274,975

NUT

Filed Oct. 23, 1941

INVENTOR.
JAMES P. BURKE
BY
Attorney

Patented Mar. 3, 1942

2,274,975

UNITED STATES PATENT OFFICE 2,274,975

NUT

James P. Burke, Struthers, Ohio, assignor to F. L. McLaughlin, Detroit, Mich.

Application October 23, 1941, Serial No. 416,157

11 Claims. (Cl. 85—36)

This invention relates to nuts of the lock nut and clinch nut type and has for its object to provide a nut which can be stamped out of sheet metal such as cold rolled steel, which may be formed with a very small number of operations and, hence, with a minimum of expense and which can be easily inserted over the threaded end of a bolt.

Another object is to provide a nut made of sheet metal which will engage the ordinary threads of a bolt and hence will not require special threads, and which has one lead each 180° to permit engagement of the nut therewith.

A further object is to provide a nut having a curved base portion which is adaptable for being pulled down against work resiliently in combination with a drawn portion which is elongated, pierced and deformed to form lead threads and engaging wall portions which crowd against the threads of a bolt inserted therein when pulled down against work.

Figure 1:
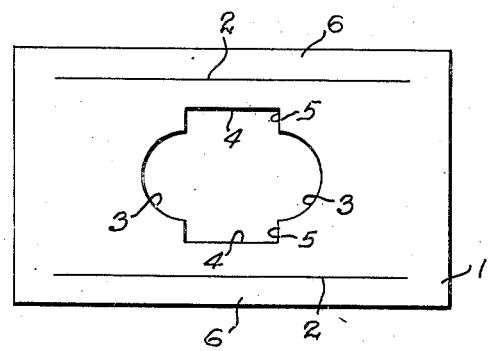

Other objects and advantages will become more fully apparent as reference is had to the accompanying drawing, wherein my invention is illustrated, and in which Fig. 1 is a top plan view of a pierced blank.

Figure 3:
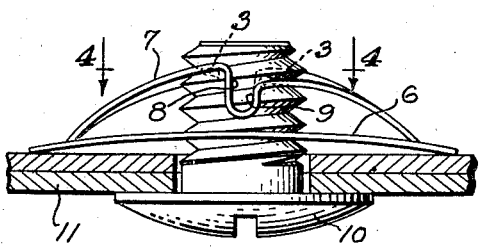
Figure 4:
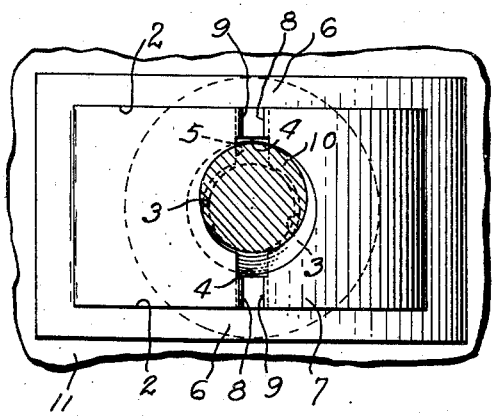
Figure 5:
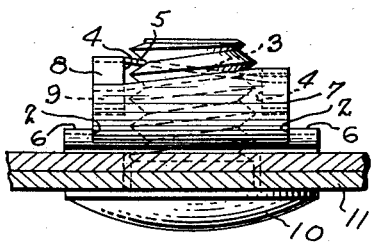
Figure 2:
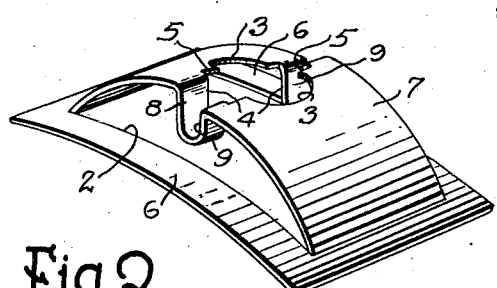

Fig. 2 is a perspective view of the completed nut formed from said blank,

Fig. 3 is a side elevation of the nut of Figs. 1 and 2 applied to work by a bolt, Fig. 4 is a horizontal section taken along the line 4—4 of Fig. 3, and Fig. 5 is an end elevation of the showing of Figs. 3 and 4.

More particularly, I indicates a nut blank in the form of a rectangular piece of sheet metal having two spaced parallel slits 2 parallel to the longer sides thereof. Between the slits 2 is an elongated cut-out of generally oval-shape consisting of two semi-circular end portions 3 connected by parallel side walls 4 set back out of tangent relation with the end portions 3 by a distance 5 greater than the depths of threads on the bolt intended to be inserted therein, as is hereinafter explained.

This blank of Figure 1 is then subjected to a press under the action of which the material 6 between the slits and the boundary walls of the blank I is slightly curved transversely of its length and thus formed into a base portion while the material between the slits is elongated into an upper portion 7. At the same time, or in a subsequent operation, that portion of the material between the side walls 4 of the cut-out and the slits 2 is crimped or formed into a U-shape with one branch 8 thereof being longer than the other branch 9 on one side of cut-out while on the other side of the cut-out the shorter branch of the U is directly opposite the longer branch 8. In other words, if the base is at horizontal rest one of the circular portions 3 will be seen to tilt slightly in one direction while the other tilts slightly in the opposite direction, to form leads for a screw-threaded bolt 9 inserted therebetween.

The crimping thus draws the ends 3 of the cut-out toward each other. If a bolt 9 of correct size be inserted through the work 10 and rotation is continued, the threads will advance in the opening 3, 3 causing the end edges of the base portion to press against the work. This, in turn, causes the edges of the portions 3, 3 to be pressed against the sides of threads by a pressure which increases with the advancing of the threads.

Various modifications may be made without departing from the spirit of my invention, and I, therefore, desire to be extended protection as defined by the appended claims.

What is claimed is:

1. A nut blank comprising a rectangular strip of sheet metal slit along spaced parallel lines, said strip having an oblong cut-out between said lines with the longer dimension in the direction of said lines.

2. A nut blank comprising a rectangular strip of sheet metal slit along spaced parallel lines, said strip having an oblong cut-out between said lines with the longer dimension in the direction of said lines, said oblong cut-out having a portion of its longer sides parallel.

3. A nut blank comprising a rectangular strip of sheet metal slit along spaced parallel lines, said strip having an oblong cut-out between said lines with the longer dimension in the direction of said lines, said oblong cut-out having a portion of its longer sides parallel, and set back with respect to the remainder thereof whereby the distance between said sides is greater than the diameter of its curved end portions.

4. A nut blank comprising a rectangular strip of sheet metal slit along spaced parallel lines, said strip having an oblong cut-out between said lines with the longer dimension in the direction of said lines, said oblong cut-out having semi-circular ends with the sides connecting said ends parallel.

5. A nut blank comprising a rectangular strip of sheet metal slit along spaced parallel lines, said strip having an oblong cut-out between said lines with the longer dimension in the direction of said lines, said oblong cut-out having semi-circular ends with the sides connecting said ends parallel and set back out of tangent relation with respect thereto.

6. The method of making a nut which consists in slitting a rectangular piece of metal along spaced parallel lines, in removing an oblong cut-out between said lines, in drawing the metal adjacent said cut-out and between said lines into an elongated curved portion and in forming a bend in the drawn portion intermediate the length thereof whereby the ends of said cut-out are made to approach each other.

7. A nut comprising a base portion of generally rectangular shape having two spaced parallel slits, the material between said slits being removed to form an elongated cut-out, the material between said slits being bent out of the plane of the material exteriorly of said slits and crimped intermediate the ends of said cut-out to pull the ends of said cut-out toward each other whereby the ends of said cut-out together form an opening to receive a bolt.

8. A nut comprising a base portion of generally rectangular shape having two spaced parallel slits, the material between said slits being removed to form an elongated cut-out, the material between said slits being bent out of the plane of the material exteriorly of said slits and crimped intermediate the ends of said cut-out to pull the ends of said cut-out toward each other whereby the ends of said cut-out together form an opening to receive a bolt, the portions at opposite sides of said cut-out being crimped in different amounts whereby a lead thread is formed by said ends.

9. A nut comprising a base portion of generally rectangular shape having spaced parallel slits extending parallel to the longer edges thereof, the material between said slits extending outwardly of the plane of said base portion and having a slot extending longitudinally thereof for a substantial distance between said slits and of substantially less over all length than the length of said slits, said material being bent downwardly toward said base portion intermediate the ends of said slot to draw the ends of said slot toward each other.

10. A nut comprising a base portion of generally rectangular shape having spaced parallel slits extending parallel to the longer edges thereof, the material between said slits extending outwardly of the plane of said base portion and having a slot extending longitudinally thereof for a substantial distance between said slits and of substantially less over all length than the length of said slits, said material being bent downwardly in a U shape toward said base portion intermediate the ends of said slot, one branch of one of the U shaped portions on one side of said slot being longer than the other branch and the diagonally opposite branch of the U-shaped portion at the other side of said slot being shorter than its other branch.

11. A nut comprising a base portion of generally rectangular shape having two spaced parallel slits, the material between said slits being removed to form an oval-shaped cut-out having semi-circular end portions connected by parallel side portions set back from a tangent relation with said end portions to form a space therebetween greater than the diameter of said end portions, the material between said slits being bent out of the plane of the material exteriorly of said slits and crimped intermediate the ends of said cut-out to pull the ends of said cut-out toward each other whereby the ends of said cut-out together form an opening to receive a bolt.

JAMES P. BURKE.